United States Patent
Barker et al.

(10) Patent No.: US 8,632,633 B2
(45) Date of Patent: Jan. 21, 2014

(54) IN-SITU GROWTH OF ENGINEERED DEFECTS IN GRAPHENE BY EPITAXIAL REPRODUCTION

(75) Inventors: Delmar L. Barker, Tucson, AZ (US);
Brian J. Zelinski, Tucson, AZ (US);
William R. Owens, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 819 days.

(21) Appl. No.: 12/868,566

(22) Filed: Aug. 25, 2010

(65) Prior Publication Data
US 2012/0048181 A1    Mar. 1, 2012

(51) Int. Cl.
*C30B 29/02*    (2006.01)
(52) U.S. Cl.
USPC .................. 117/87; 117/90; 117/94; 117/99; 117/100; 117/920; 977/722; 977/734; 977/740; 977/748; 977/750
(58) Field of Classification Search
USPC ........... 117/87, 90, 94, 97, 99, 100, 902, 920; 977/722, 734, 740, 742, 748, 750, 751
See application file for complete search history.

(56) References Cited

U.S. PATENT DOCUMENTS

| | | | |
|---|---|---|---|
| 7,619,257 B2 | 11/2009 | Pfeiffer | |
| 8,038,795 B2* | 10/2011 | Barker et al. | 117/87 |
| 2007/0187694 A1* | 8/2007 | Pfeiffer | 257/76 |
| 2009/0169919 A1 | 7/2009 | Garcia | |
| 2010/0258786 A1* | 10/2010 | Wang et al. | 257/29 |
| 2011/0100951 A1* | 5/2011 | Juang et al. | 216/13 |
| 2011/0230059 A1* | 9/2011 | Sandhu | 438/766 |

OTHER PUBLICATIONS

Mark T. Lusk et al. "Nano-Engineering Defect Structures on Graphene" Condensed Matter, Materials Science, Dec. 6, 2007.
Jannik C. Meyer "Direct Imaging of Lattice Atoms and Topological Defects in Graphene Membranes" Nano Letters 2008 vol. 8, No. 11 3582-3586.
Paolo Lacovig et al. "Growth of Dome-Shaped Carbon Nanoislands on Ir(111): The Intermediate between Carbidic Clusters and Quasi-Free-Standing Graphene" Physical Review Letters 103, 166101 (2009).
J.O. Sofo et al "Geodesic carbon nanodomes" Physics 2, 84 (2009).

(Continued)

*Primary Examiner* — Bob M Kunemund
(74) *Attorney, Agent, or Firm* — Eric A. Gifford

(57) ABSTRACT

Engineered defects are reproduced in-situ with graphene via a combination of surface manipulation and epitaxial reproduction. A substrate surface that is lattice-matched to graphene is manipulated to create one or more non-planar features in the hexagonal crystal lattice. These non-planar features strain and asymmetrically distort the hexagonal crystal lattice of epitaxially deposited graphene to reproduce "in-situ" engineered defects with the graphene. These defects may be defects in the classic sense such as Stone-Wales defect pairs or blisters, ridges, ribbons and metacrystals. Nano or micron-scale structures such as planar waveguides, resonant cavities or electronic devices may be constructed from linear or closed arrays of these defects. Substrate manipulation and epitaxial reproduction allows for precise control of the number, density, arrangement and type of defects. The graphene may be removed and template reused to replicate the graphene and engineered defects. As such, expensive and time-consuming techniques can be justified to create the template. The capability to control the defect pattern in graphene enables the creation of structured devices such as waveguides, resonant cavities and electron devices in graphene.

19 Claims, 11 Drawing Sheets

(56) References Cited

OTHER PUBLICATIONS

F. Beuneu "Nucleation and growth of single wall carbon nanotubes" Condensed Matter, Materials Science, Sep. 15, 2005.

Wenzhong Bao et al "Controlled ripple texturing of suspended graphene and ultrathin graphite membranes", Nature Nanotechnology, Jul. 26, 2009.

Jiannis K. Pachos "Manifestations of topological effects in graphene" Condensed Matter, Dec. 5, 2008.

* cited by examiner

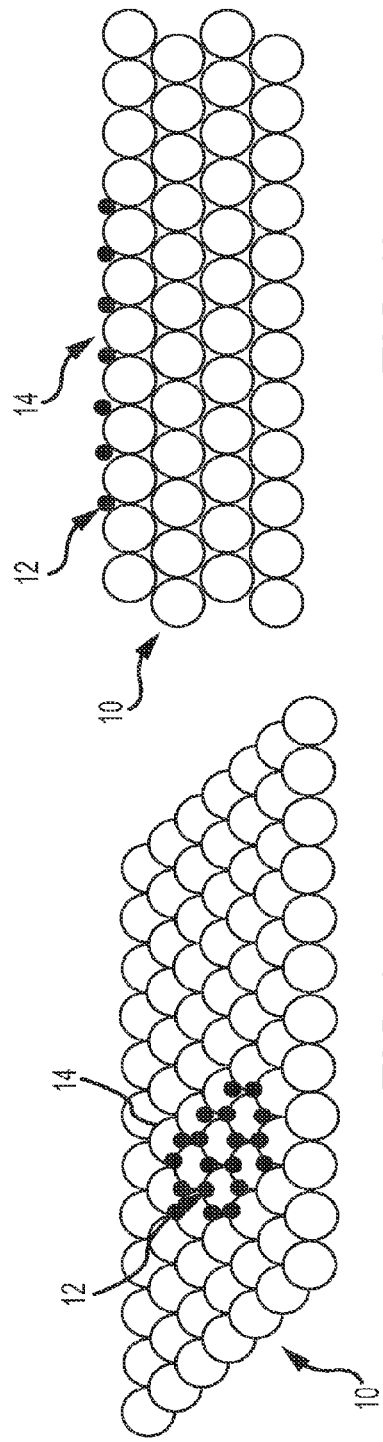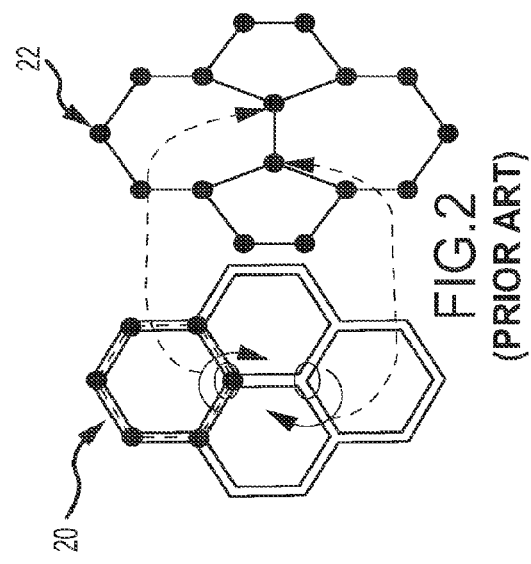

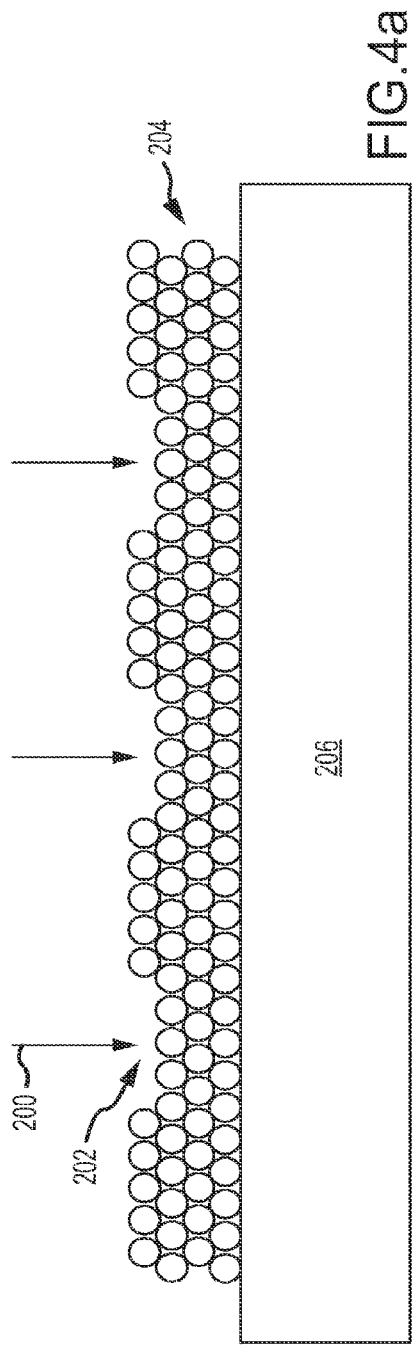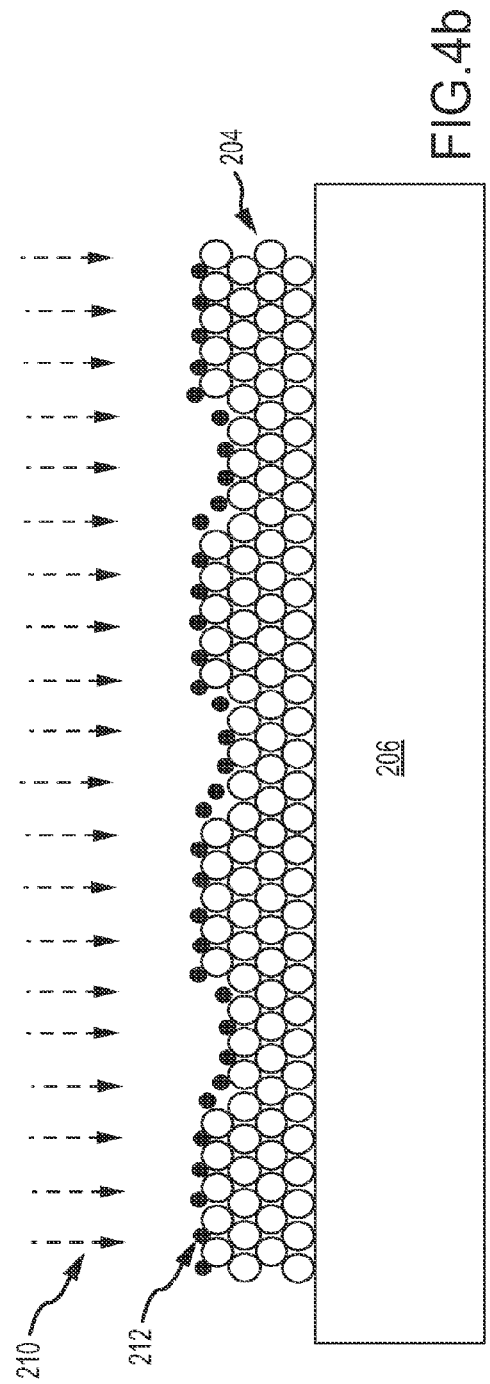

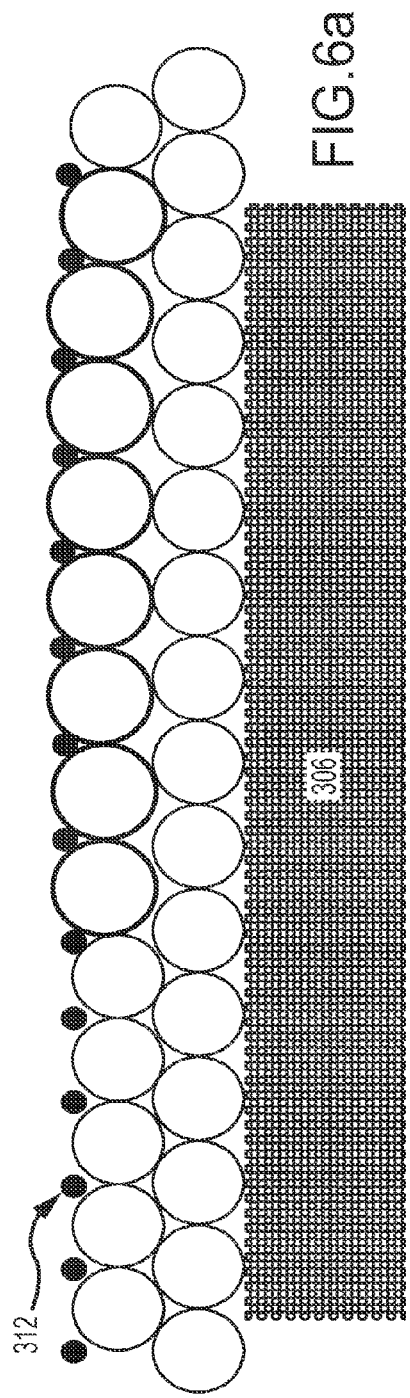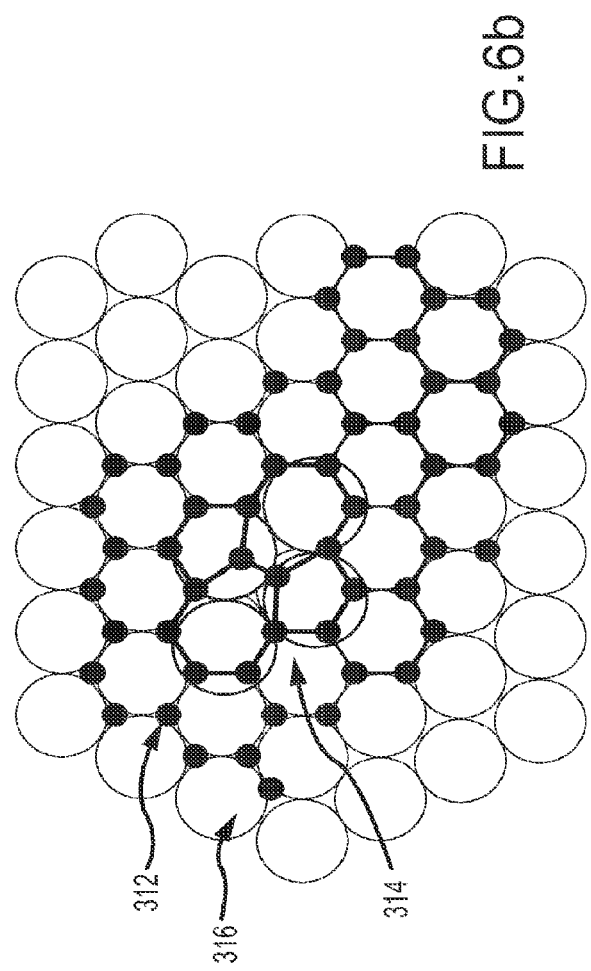

IN-SITU GROWTH OF ENGINEERED DEFECTS IN GRAPHENE BY EPITAXIAL REPRODUCTION

BACKGROUND OF THE INVENTION

1. Field of the Invention

This invention relates to epitaxial growth of graphene, and more particularly to the engineering of defects in graphene sheets.

2. Description of the Related Art

Graphene is a one-atom-thick planar sheet of $sp^2$-bonded carbon atoms that are densely packed in a honeycomb, hexagonal crystal lattice. Graphene is a basic building block for graphitic materials of all other dimensionalities. Graphene can be wrapped up into 0D fullerenes, rolled into 1D nanotubes or stacked into 3D graphite.

Graphene has rather remarkable properties. Graphene is stable, chemically inert, and crystalline under ambient conditions. It is a semimetal in that its conduction and valence bands just meet at discrete points in the Brillouin zone. An electron in graphene has an effective mass of zero and behaves more like a photon than a conventional massive particle. Finally graphene can carry huge current densities—about $10^8$ A/cm$^2$, roughly two orders of magnitude greater than copper.

Epitaxy refers to the method of depositing a monocrystalline film on a monocrystalline substrate. The deposited film is denoted as an epitaxial film or epitaxial layer. The term epitaxy comes from the Greek roots epi, meaning "above", and taxis, meaning "in ordered manner". It can be translated "to arrange upon". Epitaxial films may be grown from gaseous or liquid precursors. Because the substrate acts as a seed crystal, the deposited film takes on a lattice structure and orientation identical to those of the substrate. Techniques for epitaxy deposition include but are not limited to Molecular Beam Epitaxy (MBE), Chemical Vapor Deposition (CVD) and precipitation methods through annealing of implanted materials in the substrate.

Epitaxy may be used to a create single or a few sheets of graphene. As shown in FIGS. 1a and 1b a substrate 10 is provided that includes a single crystal region on the surface of the substrate. This region has a honeycomb, hexagonal crystal lattice substantially lattice-matched to graphene. Typical substrates include Silicon-Carbide (SiC) and elements from the periodic table including iron to copper, ruthenium to rhodium and rhenium to iridium and mixtures thereof. Carbon atoms 12 are deposited at the vertices of three adjacent atoms 14 in the substrate. The distance between these vertices is approximately the bond length of graphene. Considerable effort has been made to refine the epitaxial process in order to create perfect graphene.

More recently researchers have investigated defect structures in graphene and methods of processing the graphene to create such defect structures. As shown in FIG. 2, the hexagonal crystal lattice 20 of graphene may be disrupted to create, for example, Stone-Wales defect pairs 22. A "defect" may be any deviation from the perfect honeycomb, hexagonal lattice structure. Thermal annealing, mechanical strain and electron radiation of graphene have been proposed as techniques to create defect structures. Mark T. Lusk et al "Nano-Engineering Defect Structures on Graphene" Condensed Matter, Materials Science, 6 Dec. 2007 discloses a number of possible defect structures including blisters, ridges, ribbons and metacrystals. Lusk discloses that the defect structures may be synthesized by electron radiation or thermal activation of the graphene; a sheet of graphene is formed and then radiated or thermally activated to from the defect structures.

Jannik C Meyer "Direct Imaging of Lattice Atoms and Topological Defects in Graphene Membranes" Nano Letters 2008 Vol. 8, No. 11 3582-358 uses an electron beam associated with an electron microscope to both create Stone-Wales defect pairs in graphene and to view the defects; a sheet of graphene is formed then radiated with an electron beam to form the defects.

Because of its unique electrical properties, researchers are also investigating the use of graphene in electronic devices such as transistors and integrated circuits. U.S. Pat. No. 7,619,257 discloses a device in which one epitaxial layer of graphene is disposed on a lattice-matched substrate. A multilayered, single crystal, electrically insulative second region that is lattice-matched to graphene is disposed on the graphene. In an embodiment, a channel region of a field effect transistor (FET) is formed in the graphene.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides epitaxial growth of engineered defects in-situ in graphene.

This is accomplished through a combination of surface manipulation of the substrate to create non-planar features with epitaxial reproduction of those features as defects in the graphene. The provided substrate includes a single crystal region on a surface of the substrate in which the region has a hexagonal crystal lattice substantially lattice-matched to graphene. The surface of the single crystal region is manipulated to create one or more non-planar features in the hexagonal crystal lattice. Many different technologies including but not limited to focused ion beam (FIB) milling, atomic force microscopy (AFM), nanometer layered vapor deposition, sputtering and self-assembly may be employed to manipulate the surface of the substrate. A layer of carbon atoms is epitaxially deposited on the surface of the single crystal region over the one or more non-planar features. The non-planar features strain and asymmetrically distort the hexagonal crystal lattice of graphene to reproduce the engineered defects "in-situ". These defects may be defects in the classic sense such as Stone-Wales defects and defect pairs or blisters, ridges, ribbons and metacrystals. Nano or micron-scale structures such as planar waveguides, resonant cavities or electronic devices may be constructed from linear or closed arrays of these defects. The graphene sheet may be removed from the substrate and the substrate reused as a template to duplicate the same defect pattern in additional graphene sheets.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 1a and 1b, as describe above, are perspective and section views of an epitaxial graphene on a graphene-matched substrate;

FIG. 2, as described above, is a diagram illustrating the disruption of the graphene lattice to form a Stone-Wales defect pair;

FIGS. 4a-4c are diagrams of an embodiment for manipulating the surface of the substrate to produce an ordered array of non-planar 'pit' features that induce the formation of a mirrored array of defects in the graphene;

FIGS. 5a-5b, 6a-6b and 7 are diagram of another embodiment for manipulating the surface of the substrate to produce an ordered array of non-planar 'bump' features that induce the formation of a mirrored array of defects in the graphene;

DETAILED DESCRIPTION OF THE INVENTION

The present invention provides in-situ growth of engineered defects in graphene via substrate manipulation and epitaxial reproduction. The substrate surface is manipulated to create one or more non-planar features in the hexagonal crystal lattice to form a template. These non-planar features strain and asymmetrically distort the hexagonal crystal lattice of epitaxially deposited graphene to reproduce "in-situ" engineered defects within the graphene. Epitaxial deposition of a single layer of carbon atoms over the substrate copies the hexagonal lattice structure as well as the non-planar features to form the defects in graphene. These defects may be defects in the classic sense such as Stone-Wales defects and defect pairs or blisters, ridges, ribbons and metacrystals. Nano or micron-scale structures such as planar waveguides, resonant cavities or electronic devices may be constructed from linear or closed arrays of these defects.

This in-situ approach of epitaxial reproduction of defects formed in the substrate has numerous advantages over conventional ex-situ techniques of thermal activation, mechanical stress and electron radiation of graphene to form defects. In those approaches, the number, density, arrangement and even type of defects is difficult to control. Manipulation of the substrate to form a template in conjunction with epitaxial reproduction allows for precise control of the number, density, arrangement and type of defects. The individual defects may range in size from approximately 1 nm to 20 nm with defect structured from 1 nm of up to approximately 10 to a 100 microns. The graphene may be removed and template reused to replicate the graphene and engineered defects. As such, expensive and time-consuming techniques can be justified to create the template. The capability to control the defect pattern in graphene enables the creation of structured devices such as waveguides, resonant cavities and electron devices in graphene.

Figure 3:
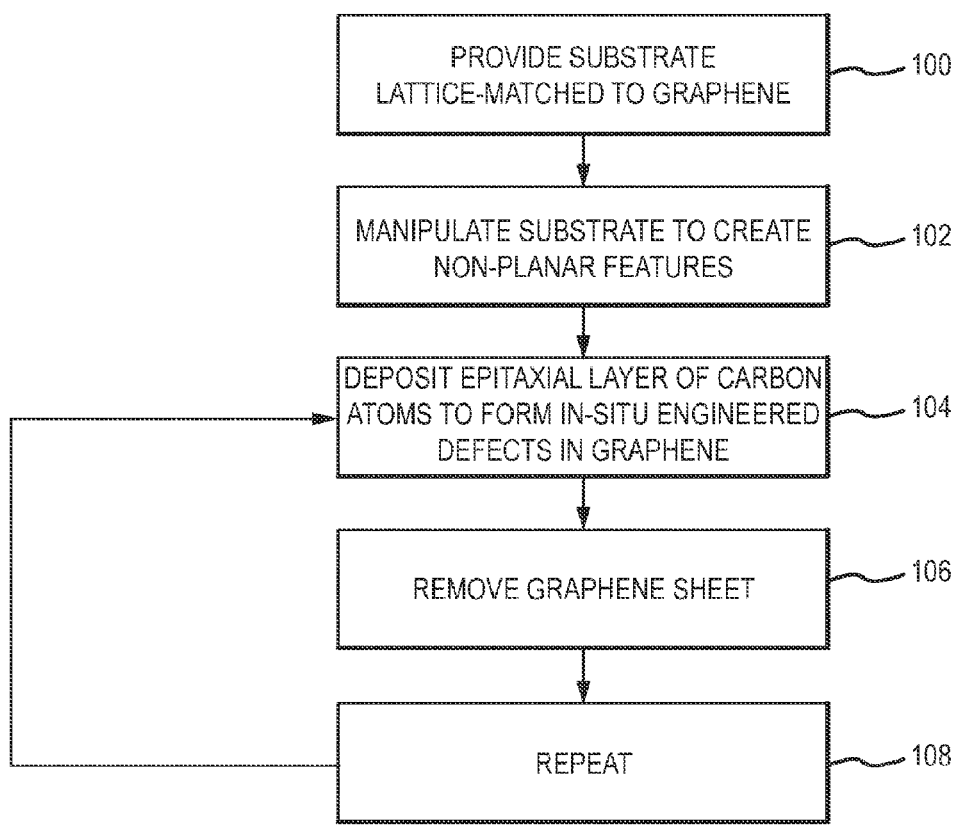
FIG. 3 is a flow diagram of an epitaxial process for forming engineered defects in-situ with graphene through the manipulation of the graphene-matched substrate to create non-planar features in conjunction with epitaxial reproduction in accordance with the present invention.

Referring now to FIG. 3, the first step in the in-situ growth of engineered defects in graphene is to provide a substrate that is lattice-matched to graphene (step 100). The provided substrate includes a single crystal region on a surface of the substrate in which the region has a hexagonal crystal lattice substantially lattice-matched to graphene. Typical substrates include Silicon-Carbide (SiC) and elements from the periodic table including iron to copper, ruthenium to rhodium and rhenium to iridium and mixtures thereof. Any substrate in which the vertices of three atoms are separated by approximately the bond length of graphene and arranged in a hexagonal pattern will suffice. The surface of the single crystal region is manipulated to create one or more non-planar features in the hexagonal crystal lattice (step 102). For a single defect, the non-planar features may range in size from approximately 1 nm to approximately 20 nm. Multiple defects may be arranged to form nano- and micro-sized structures from approximately 1 nm to approximately 10 microns or up to approximately 100 microns. A layer of carbon atoms is epitaxially deposited on the surface of the single crystal region over the one or more non-planar features (step 104). Any technique suitable for depositing an epitaxial layer of carbon atoms on the substrate will suffice. Standard techniques for epitaxial growth include Molecular Beam Epitaxy (MBE) and Chemical Vapor Deposition (CVD). The non-planar features strain and asymmetrically distort the hexagonal crystal lattice of graphene to reproduce the engineered defects "in-situ". These defects may be defects in the classic sense such as Stone-Wales defect pairs or blisters, ridges, ribbons and metacrystals. Nano or micron-scale structures such as planar waveguides, resonant cavities or electronic devices may be constructed from linear or closed arrays of these defects. Manipulation of the substrate in this manner allows for the precise control of the structured pattern of engineered defects in which the pattern comprises a particular type of defect, arrangement of defects and density of defects. This type of precise control cannot be provided by existing techniques that mechanically stress, thermally active or radiate the graphene layer after it has been deposited epitaxially. In some applications, the graphene sheet may be removed from the substrate (step 106) and the substrate reused as a template (step 108), repeating step 104 to duplicate the same defect pattern in additional graphene sheets. These sheets may be deployed separate or combined into some type of device. Existing techniques are incapable of repeating the same defect pattern in this manner.

Many different technologies including but not limited to focused ion beam (FIB) milling, atomic force microscopy (AFM), nanometer layered vapor deposition, sputtering and self-assembly may be employed to manipulate the surface of the substrate. Each of these techniques may manipulate the substrate to produce non-planar features in the hexagonal lattice. One approach is to remove material, individual atoms, from the surface of the substrate to create well-defined "pits". Another approach is to add material, perhaps replacing individual atoms with larger atoms, to create bell-define "bumps". The two approaches may be combined to form pits and bumps in the substrate. These "pits" and "bumps" have the effect of straining and asymmetrically distorting the hexagonal crystal lattice of graphene as it is epitaxially deposited to reproduce "in-situ" engineered defects within the graphene. Because the substrate forms a template that can be reused to produce many graphene sheets, time-intensive and costly technologies can be used to manipulate the substrate while still providing a cost-effective solution to produce engineered defects in graphene. Furthermore, these technologies allow for precise definition of the non-planar features/defects and their number, arrangement and density.

Figure 4C:
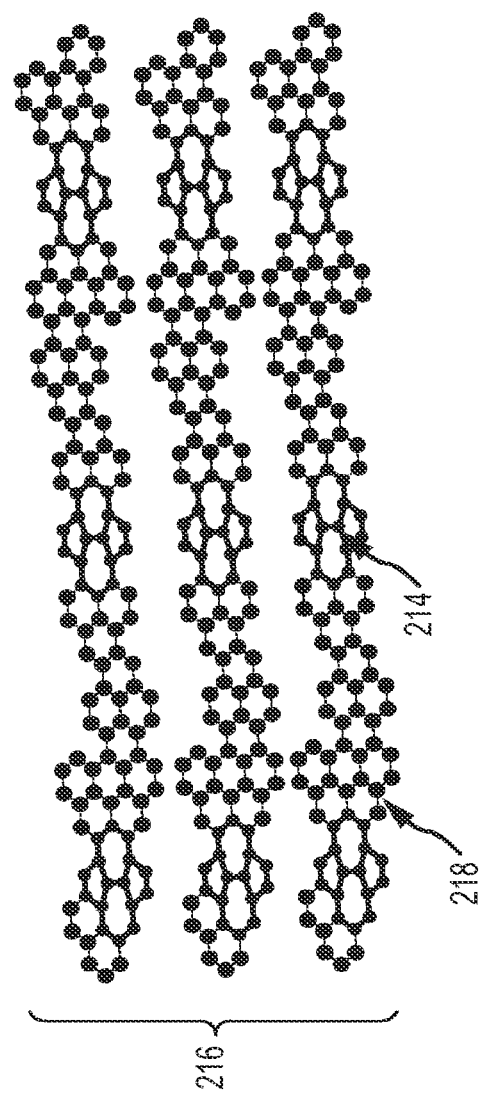
Figure 5A:
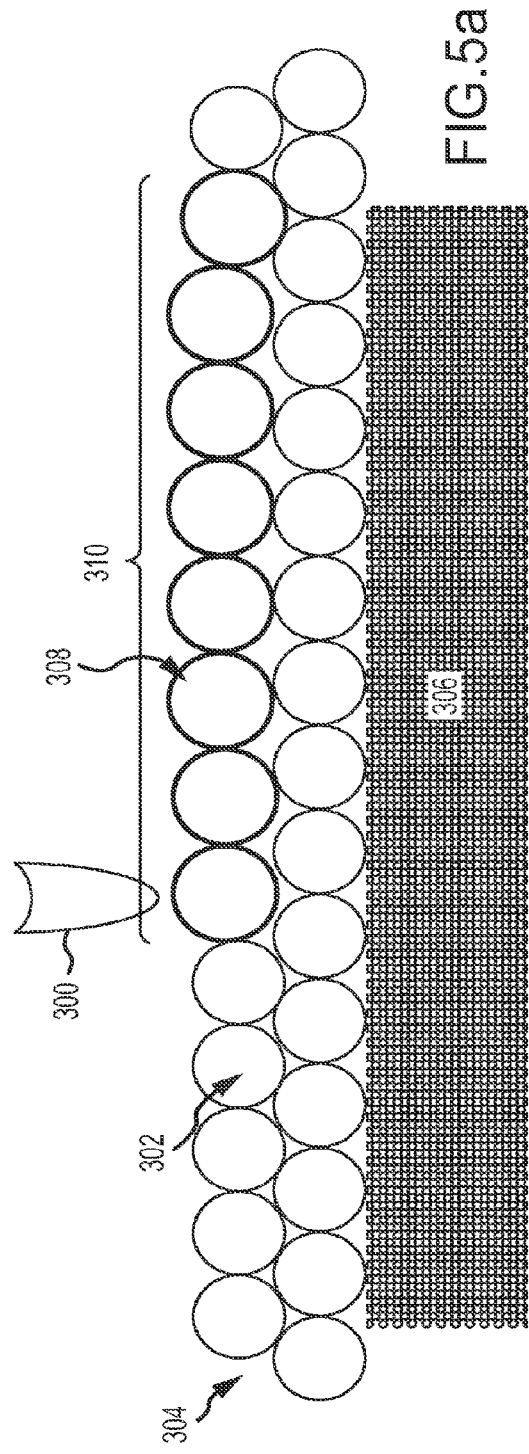
Figure 5B:
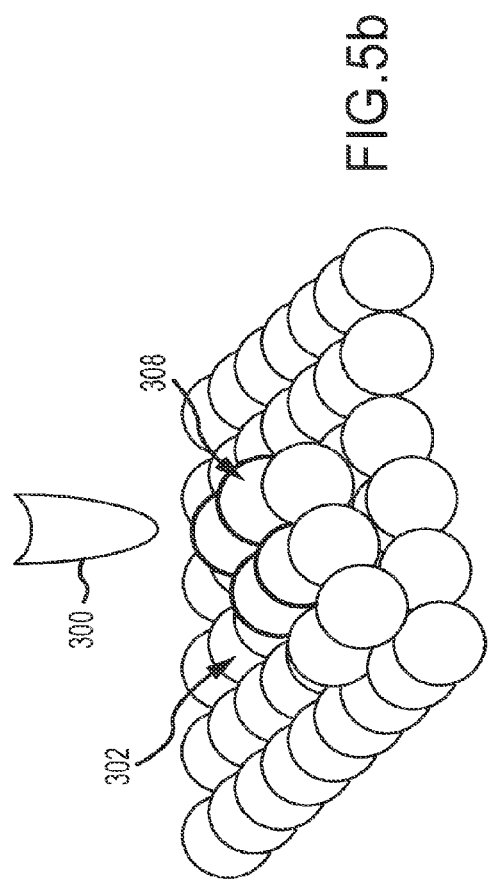
Figure 7:
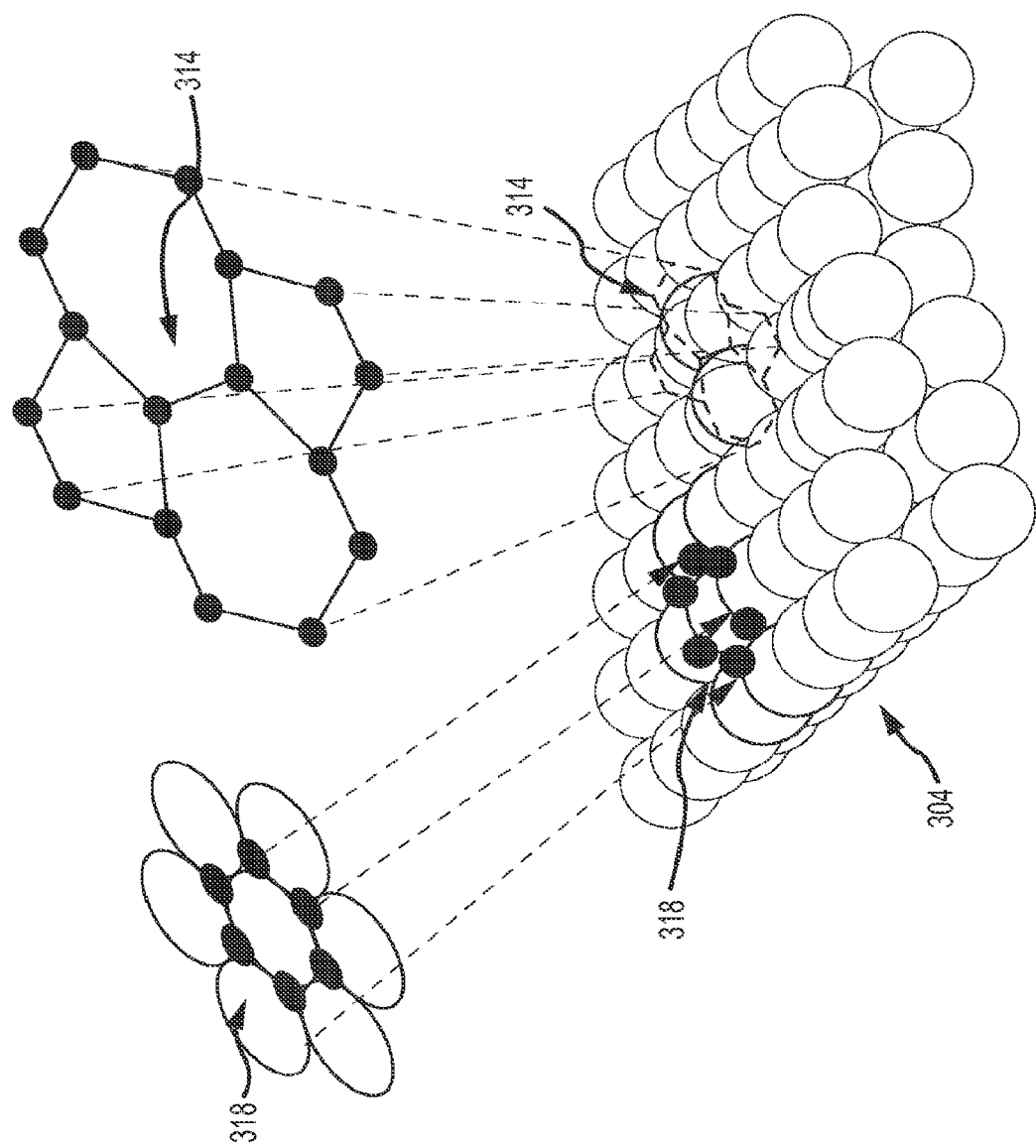

Referring now to FIGS. 4a-4c, in an embodiment a FIB 200 is used to mill a pattern of pits 202 in the hexagonal lattice on the surface of an iron (Fe) substrate 204 suitably provided on a silicon carrier 206. A molecular beam 210 is used to deposit a single epitaxial layer of carbon atoms 212 over the substrate forming in-situ engineered Stone-Wales defect pairs 214 in a structured pattern 216 in a graphene sheet 218. The pits are designed and milled to stress the 6:6 hexagonal lattice to produce the 5:7 Stone-Wales defect pairs. FIB milling may be used to manipulate the surface of the substrate to produce any type and pattern of defects. Additional epitaxial layers may be deposited. Subsequent layers may replicate the defect pattern, may include different defects due to the reduction in stress through the layers or may be free of any such defects.

Referring not to FIGS. 5a-5b, 6a-6b and 7, in an embodiment an atomic force microscope (AFM) 300 is used to selectively remove iron (Fe) atoms 302 from the hexagonal lattice on the surface of a substrate 304 suitably provided on a carrier 306 and replace them with larger gold (Au) atoms 308 to form a bump 310. This technique can be repeated to provide a pattern of the same or different bumps. FIB milling or other techniques could be used to remove the Fe atoms and the AFM used to position the Au atoms. Alternately, the Fe atoms could be replaced with smaller atoms to form pits. A CVD process is used to deposit an epitaxial layer of carbon atoms 312 over the substrate forming in-situ an engineered Stone-Wales defect pair 314 in a graphene sheet 316. The pits are designed and constructed to stress the 6:6 hexagonal lattice 318 to produce the 5:7 Stone-Wales defect pairs.

Another approach is to modify broad area sputtering of CVD process. The rate of deposition per unit area can be controlled to produce nanometer or sub-nanometer thick layers on cold substrates. This thin film may be heated to its melting point; surface tension will cause the liquid to form nanometer size liquid drops of atoms. Subsequent cooling solidifies the balls of atoms. By pre-patterning the underlying surface these nanoballs can be made to form arrays with specified separations. This array of nanoballs on the substrate provides a manipulated substrate on which an epitaxial layer of graphene can be deposited with engineered defects formed in-situ with the position of the nanoballs.

As described and illustrated, a key differentiator of the present approach over the conventional technologies for creating defects in graphene is the ability to precisely control the defects and the pattern of defects. The conventional techniques of mechanical stress, thermal activation and radiation produce defects quite randomly with little control over the induced defect or the number, arrangement or density of defects. By manipulating the substrate in a precise manner and relying on epitaxial reproduction to produce in-situ the engineered defects in graphene we can exercise control over the individual defects and pattern of those defects.

Figure 8:
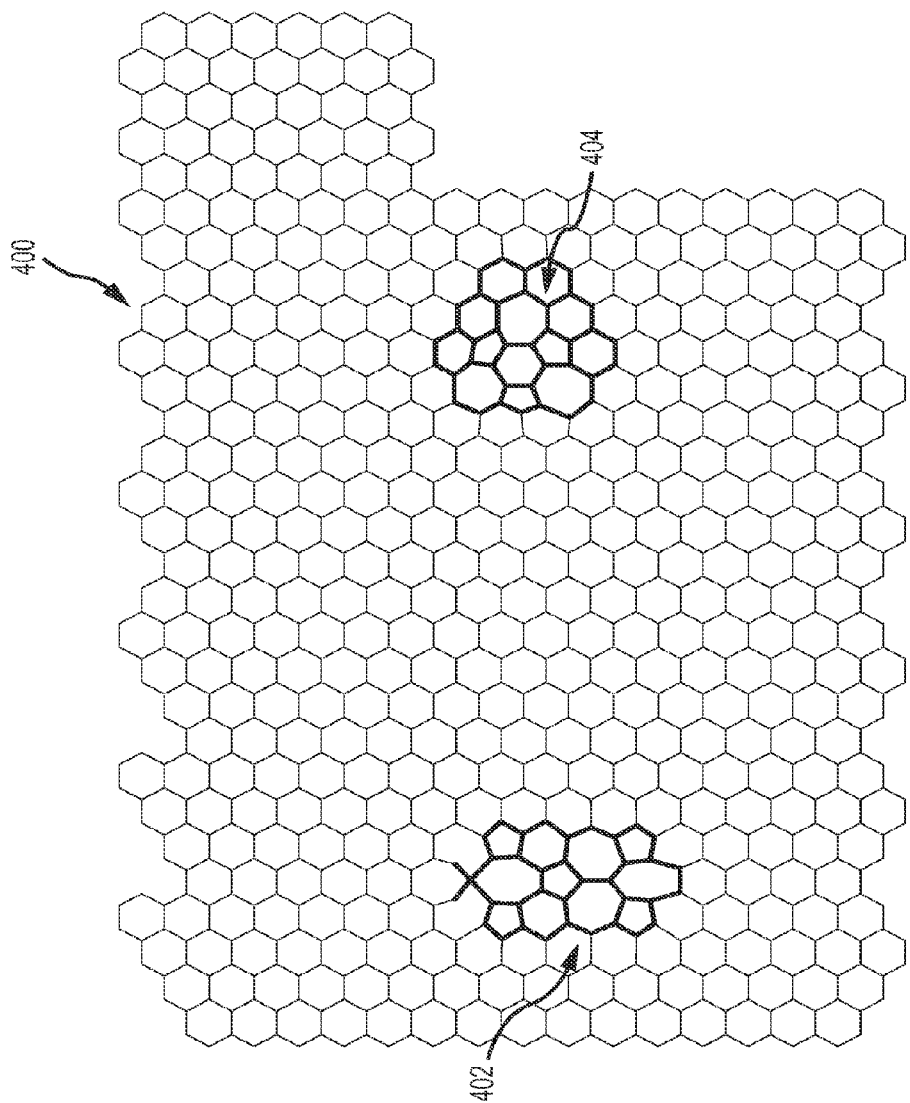
FIG. 8 is a diagram of graphene including different engineered defects located in different locations.

Referring now to FIG. 8, the technique of substrate manipulation and epitaxial reproduction has been used to create two different defects in a graphene sheet 400. The first defect 402 is a ribbon defect and the second defect 404 is a blister defect as defined in the Lusk paper. With our approach we create a structured pattern of these two defects or any two or more defects. This precise control over the defect pattern is beyond the state-of-the art.

The capability to produce precise defect patterns allows for the construction of nano- and micro-structures. Such structures may have dimensions as small as approximately 1 nm up to approximately 10 microns or approximately 100 microns. These structures may define planar devices within the graphene sheet or three-dimensional devices between the graphene sheet and other components or between multiple graphene sheets.

Figure 9:
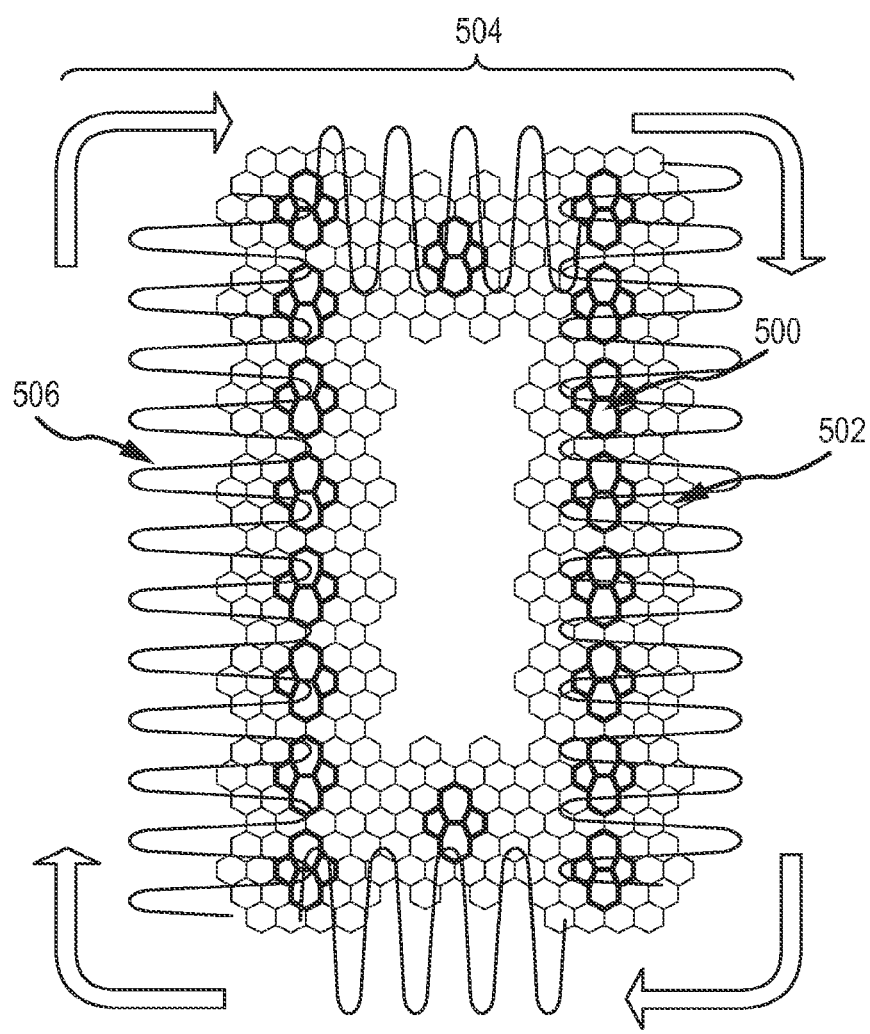
FIG. 9 is a diagram of a resonant cavity constructed from an ordered array of engineered defects in graphene.

Referring now to FIG. 9, the technique of substrate manipulation and epitaxial reproduction has been used to create a pattern of Stone-Wales defect pairs 500 in a graphene sheet 502 that define a planar resonant cavity 504. The periodic structure of Stone-Wales defect pairs 500 in the background of the regular graphene hexagonal lattice confines a single wavelength 506 (Plasmon, phonon) to resonate around the racetrack configuration. The cavity can be fed by partially coupling analogues to partially silvered mirrors used in laser cavity devices except here on a much smaller scale. The defects may be other than Stone-Wales defect pairs and the pattern may take on many different arrangements to define a resonant cavity.

Figure 10:
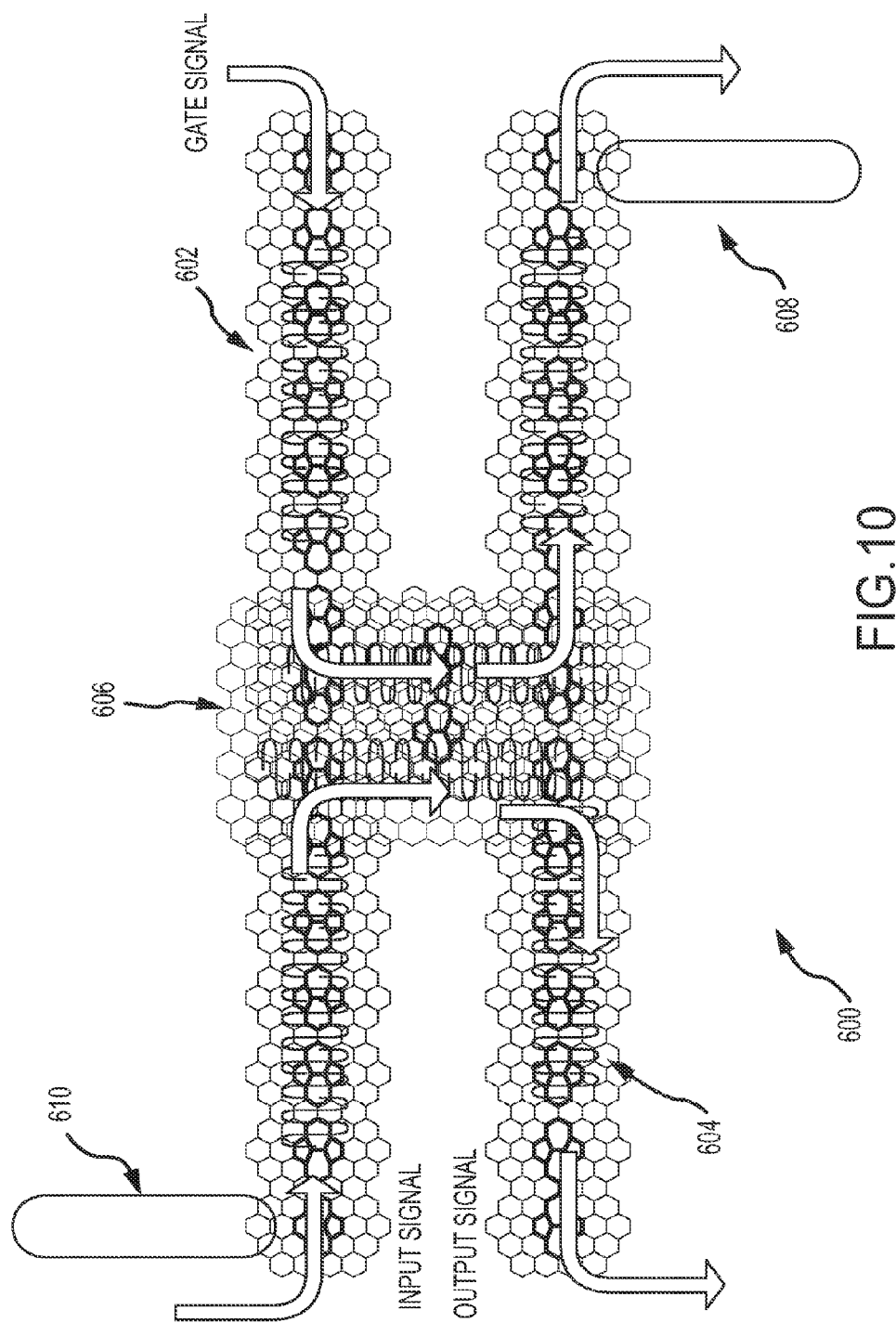
FIG. 10 is a diagram of a coupled waveguide constructed from an ordered array of engineered defects in graphene.

Referring now to FIG. 10, the technique of substrate manipulation and epitaxial reproduction has been used to create a capacitively coupled waveguide 600. In this embodiment, the waveguide comprises three epitaxial layers that have been fabricated and assembled. Substrate manipulation and epitaxial reproduction has been used to create upper and lower planar waveguides 602 and 604, respectively. Each provides a waveguide in a particular band. Each of these layers comprises a pattern of engineered defects that define a waveguide in a graphene sheet. A graphene sheet 606 sans defects may be used as a spacer to separate the upper and lower planar waveguides. Electrodes 608 and 610 are contacted to the upper and lower waveguides, respectively. Input and gate signals are applied to the respective waveguides. Application of a voltage causes the signals to interact. The coupled waveguide may be configured as a mixer or an interference device depending on signal amplitude.

Figure 11:
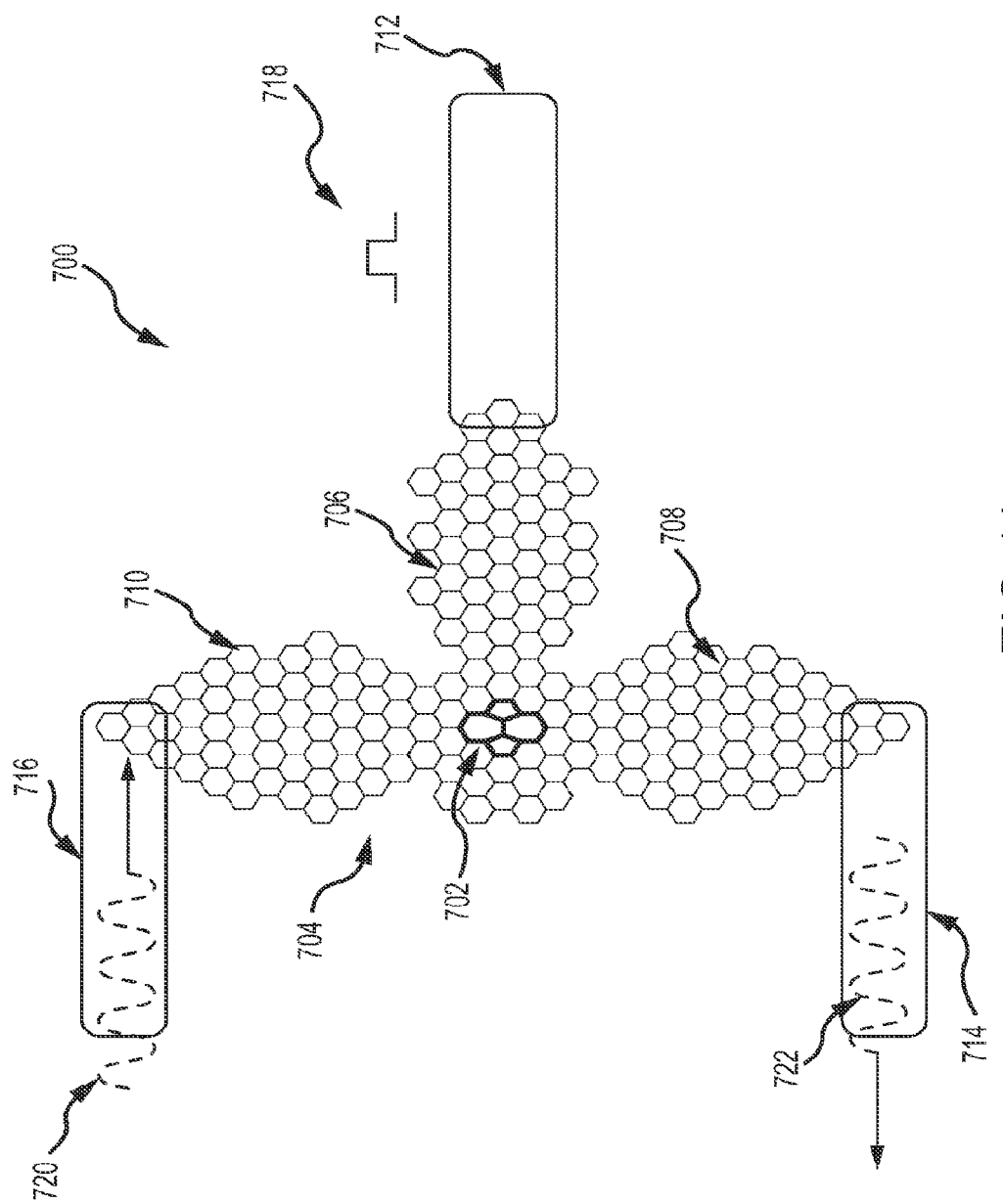
FIG. 11 is a diagram of a FET constructed from an engineered defect in graphene

Referring now to FIG. 11, the technique of substrate manipulation and epitaxial reproduction has been used to create a Field Effect Transistor (FET) 700. In this particular embodiment, a single Stone-Wales defect pair 702 in a graphene sheet 704 creates a local potential barrier that can be raised or lowered according to an applied gate voltage signal. Graphene sheet 704 is patterned to define a gate 706, drain 708 and source 710 that are connected to respective electrodes 712, 714 and 716. When a voltage signal 718 is applied to the gate, the barrier is lowered and an input signal 720 at the source passes through the graphene to the drain as output signal 722.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of forming in-situ engineered defects in graphene, comprising the steps of:
   providing a substrate including a single crystal region on a surface of the substrate, said region having a hexagonal crystal lattice substantially lattice-matched to graphene;
   manipulating the surface of the single crystal region to create one or more non-planar features in the hexagonal crystal lattice; and
   epitaxially forming a layer of carbon atoms on the surface of the single crystal region to reproduce in-situ engineered defects over the one or more non-planar features in a graphene sheet.

2. The method of claim 1, wherein the non-planar features strain and asymmetrically distort the hexagonal crystal lattice of the epitaxially formed graphene to form in-situ the engineered defects.

3. The method of claim 1, wherein the surface is manipulated to create the one or more non-planar features of a specific size and shape to form a particular engineered defect.

4. The method of claim 1, wherein the surface is manipulated to create a structured pattern of non-planar features to form a structured pattern of engineered defects.

5. The method of claim 4, wherein the structured pattern of non-planar features form the structured pattern of engineered defects, said pattern comprising a particular type of defect, arrangement of defects and density of defects.

6. The method of claim 1, wherein individual defects have a maximum dimensions from approximately 1 nm to approximately 20 nanometers.

7. The method of claim 1, wherein the defects form structures having a maximum dimensions from approximately 1 nm to approximately 100 um.

8. The method of claim 1, wherein the in-situ engineered defects comprise Stone-Wales defect pairs.

9. The method of claim 1, wherein the in-situ engineered defects define a planar waveguide.

10. The method of claim 1, wherein the in-situ engineered defects define a resonant cavity.

11. The method of claim 1, wherein different in-situ engineered defects define a planar semiconductor device in the graphene sheet.

12. The method of claim 1, further comprising epitaxially forming a second layer of carbon atoms to form a second graphene sheet.

13. The method of claim 1, wherein the surface of the single crystal region is manipulated to form non-planar features comprising pits in the surface.

14. The method of claim 1, wherein the surface of the single crystal region is manipulated to form non-planar features comprising bumps on the surface.

15. The method of claim 1, wherein the surface of the single crystal region is manipulated to form non-planar features comprising pits in and bumps on the surface.

16. The method of claim 1, wherein the surface of the single crystal region is manipulated to form non-planar features to form different in-situ engineered defects at different locations in the graphene sheet.

17. A method of forming in-situ engineered defects in graphene, comprising the steps of:

providing a substrate including a single crystal region on a surface of the substrate, said region having a hexagonal crystal lattice substantially lattice-matched to graphene;

manipulating the surface of the single crystal region to create one or more non-planar features in the hexagonal crystal lattice; and epitaxially forming a layer of carbon atoms on the surface of the single crystal region to form a graphene sheet, said non-planar features straining and asymmetrically distorting the hexagonal crystal lattice of the epitaxially formed graphene to reproduce in-situ engineered Stone-Wales defects or defect pairs over the one or more non-planar features in a graphene sheet.

18. The method of claim 17, wherein the surface is manipulated to create a structured pattern of non-planar features to form a structured pattern of engineered defects comprising a particular type of defect, arrangement of defects and density of defects.

19. A method of forming in-situ engineered defects in graphene, comprising the steps of:

providing a substrate including a single crystal region on a surface of the substrate, said region having a hexagonal crystal lattice substantially lattice-matched to graphene;

manipulating the surface of the single crystal region to create one or more non-planar features in the hexagonal crystal lattice;

epitaxially forming a layer of carbon atoms on the surface of the single crystal region to reproduce in-situ engineered defects over the one or more non-planar features in a first graphene sheet;

removing the graphene sheet including the in-situ engineered defects; and epitaxially forming a layer of carbon atoms on the surface of the single crystal region to reproduce in-situ engineered defects over the one or more non-planar features in a second graphene sheet substantially similar to the first graphene sheet.

* * * * *